United States Patent [19]
Yamamuro

[11] Patent Number: 5,684,774
[45] Date of Patent: Nov. 4, 1997

[54] OPTICAL DISK APPARATUS

[75] Inventor: Mikio Yamamuro, Zushi, Japan

[73] Assignee: Kabushiki Kaisha Toshiba, Kawasaki, Japan

[21] Appl. No.: 727,136

[22] Filed: Oct. 8, 1996

Related U.S. Application Data

[60] Continuation of Ser. No. 530,088, Sep. 19, 1995, abandoned, which is a division of Ser. No. 310,485, Sep. 22, 1994, Pat. No. 5,481,531.

[30] Foreign Application Priority Data

Sep. 24, 1993 [JP] Japan ................................. 5-238438

[51] Int. Cl.$^6$ .................................................. G11B 5/09
[52] U.S. Cl. ............................ 369/59; 369/47; 369/275.3
[58] Field of Search .............................. 369/47, 48, 59, 369/58, 54, 275.3, 51.32; 360/48, 49, 51

[56] References Cited

U.S. PATENT DOCUMENTS

| | | | |
|---|---|---|---|
| 4,896,311 | 1/1990 | Ishihara | 369/47 |
| 4,918,677 | 4/1990 | Ashinuma et al. | 369/32 |
| 5,210,733 | 5/1993 | Yamaguchi et al. | 369/32 |
| 5,245,595 | 9/1993 | Yasukawa | 369/32 |
| 5,255,261 | 10/1993 | Iida et al. | 369/275.3 |
| 5,257,248 | 10/1993 | Ogasawara | 369/275.3 |
| 5,278,814 | 1/1994 | Deguchi et al. | 369/47 |
| 5,305,302 | 4/1994 | Hardwick | 369/275.3 |
| 5,400,309 | 3/1995 | Satomura | 369/32 |
| 5,436,878 | 7/1995 | Yamaguchi et al. | 369/47 |

*Primary Examiner*—Tan Dinh
*Attorney, Agent, or Firm*—Cushman, Darby & Cushman IP Group of Pillsbury Madison & Sutro LLP

[57] ABSTRACT

An apparatus for recording data on an M-CAV-formatted optical disk. The disk has a plurality of substantially concentric tracks grouped into a plurality of zones arranged in a radial direction of the disk. Each of the zones is divided into the same number of sectors, each used as a unit area, and has a different assigned frequency at which to read read data from the sectors. Header information is recorded in the start region of each sector and identifies the sector. Provided next to the start region is a data field in which data is to be recorded. The apparatus is designed to record data in the data field by using a master clock signal having a specific frequency assigned to the zone including that data field. The apparatus has a master clock setting circuit for setting the frequency assigned to any zone to which the zone will be switched from the zone in which data is being recorded. When the zone is switched to that zone, the gain of the master clock setting circuit is increased temporarily, thereby switching the frequency of the master clock signal within a short time.

8 Claims, 8 Drawing Sheets

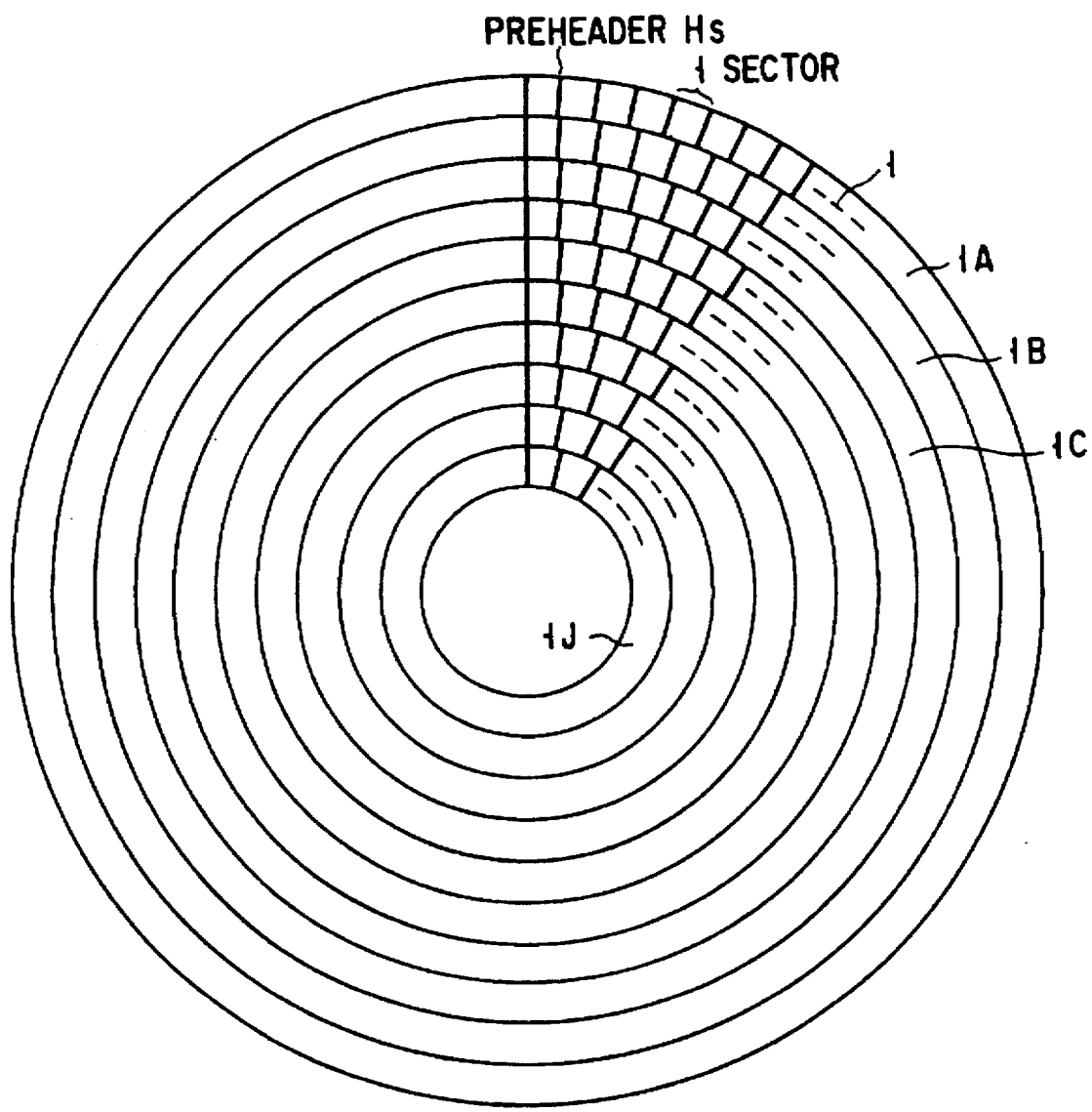
F I G. 2

| ZONE NUMBER | SECTOR/ROUND | FREQUENCY DEVIATION |
|---|---|---|
| 1 | 30 | 6.7 % |
| 2 | 32 | 5.9 % |
| 3 | 34 | 5.6 % |
| 4 | 36 | 5.3 % |
| ⋮ | ⋮ | ⋮ |
|  |  | 4.2 % |
| 10 | 50 |  |

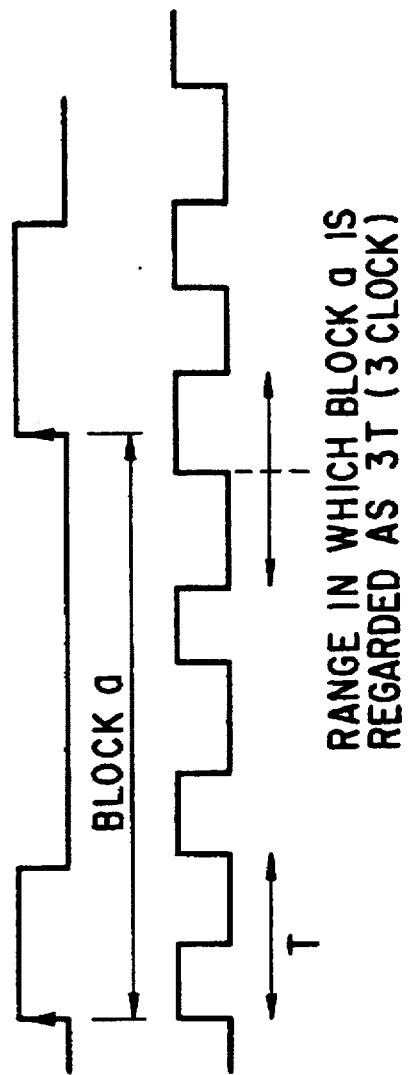

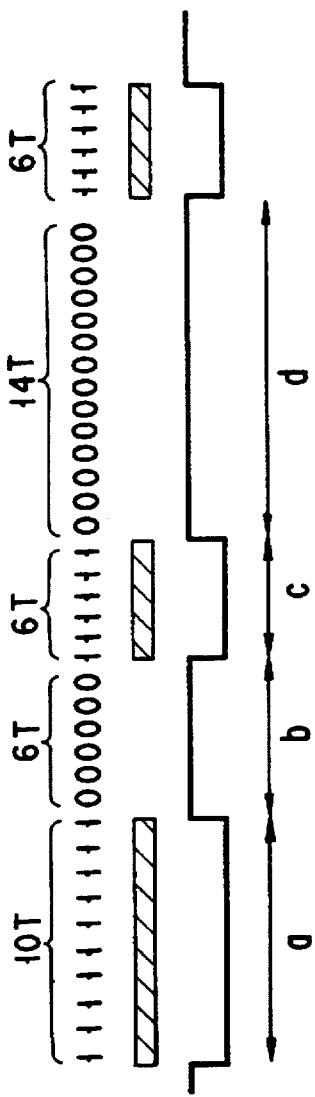
FIG. 7A
FIG. 7B
FIG. 7C
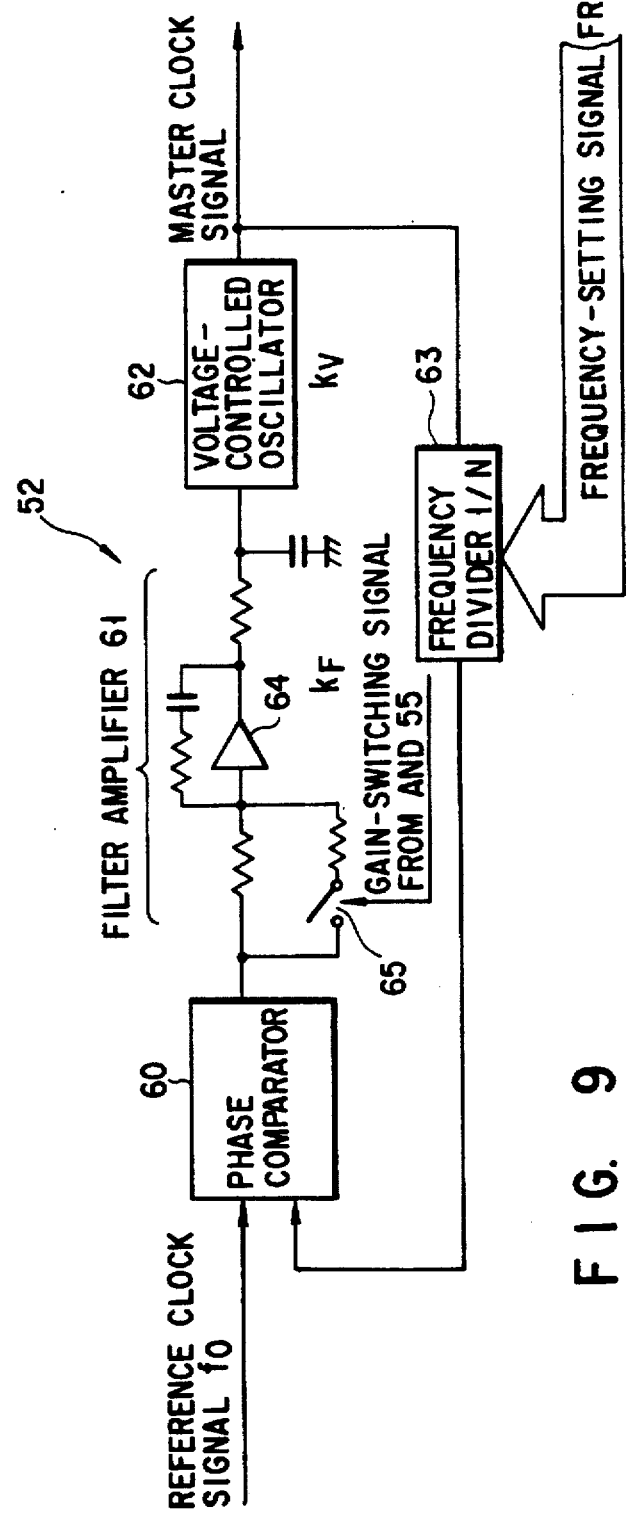
FIG. 9

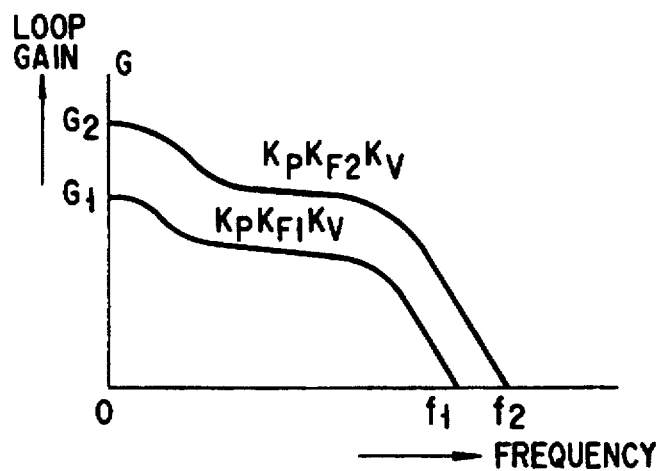
FIG. 10
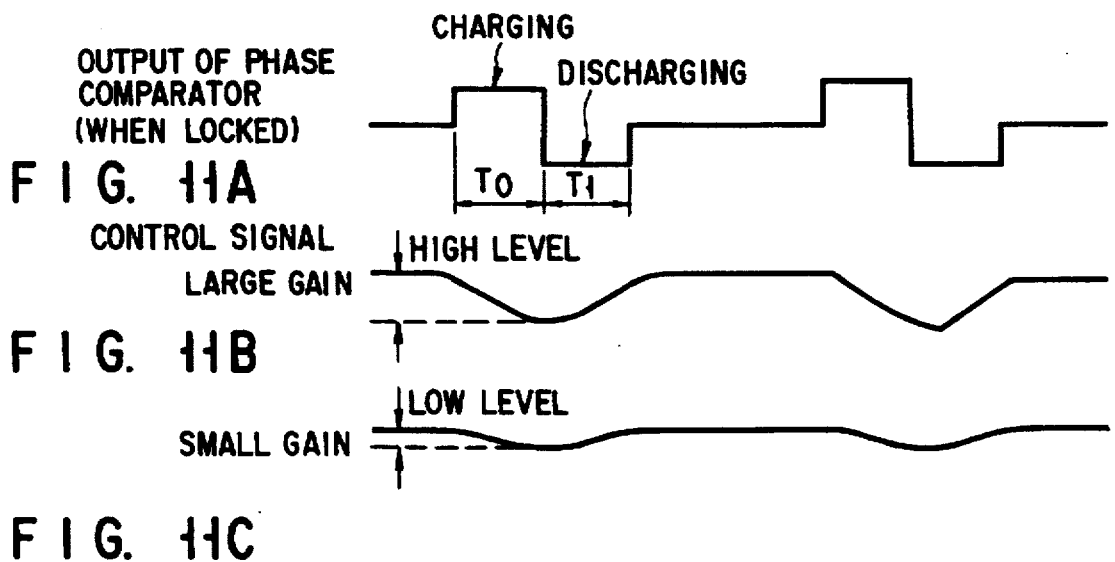
FIG. 11A
FIG. 11B
FIG. 11C

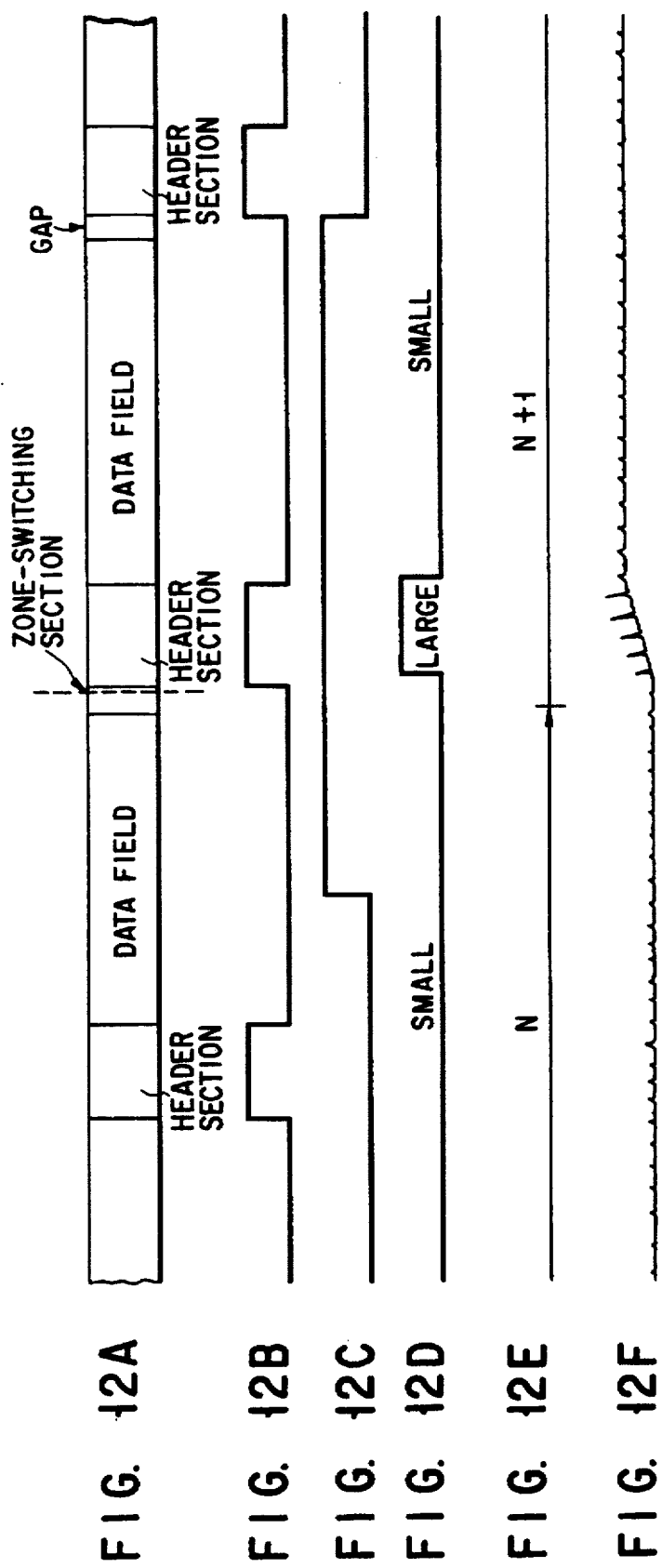

OPTICAL DISK APPARATUS

This is a continuation of application Ser. No. 08/530,088, filed on Sep. 19, 1995, which was abandoned upon the filing hereof, which in turn was a division of application Ser. No. 08/310,485, filed on Sep. 22, 1994, issued on Jan. 2, 1996 as U.S. Pat. No. 5,481,531.

BACKGROUND OF THE INVENTION

1. Field of the Invention

The present invention relates to an optical disk apparatus, more specifically to the type which record/erase data on/from an optical disk having a plurality of tracks grouped into a plurality of zones arranged in its radial direction, using a particular frequency clock for a different zone.

2. Description of the Related Art

Optical disks are formatted in advance for achieving a large storing capacity, reproduction of data accurately from a target address, and storage of data accurately into a target address. There are two known formatting modes, i.e. the CLV (constant linear velocity) mode in which the rotation of the motor is controlled in inversely proportional to the radius of the track, and the track is followed at a constant linear speed at all times, and the CAV (constant angular velocity) mode in which the rotation of the optical disk is set at constant.

As compared to the CLV mode, the CAV mode provides an easier control of the motor which rotates the optical disk; however, entails the problem of a small memory capacity. In order to increase the memory capacity of the optical disk as the CAV mode, the Z-CAV (zone constant angular velocity) mode or the M-CAV (modified constant angular velocity) mode is used as a further formatting method. In either the Z-CAV mode or the M-CAV mode, an optical disk is divided into a plurality of zones each formed of a plurality of tracks arranged in its radial direction. Each zone has the same number of selectors per one track within that zone, and a different zone has a different number of selectors per one track. According to the Z-CAV mode, when data is stored onto an optical disk or reproduced therefrom, the optical disk is rotated at a constant speed, and the storing or reproducing operation is carried out by using an optical head with reference to a particular frequency clock which is different from one zone to another. More specifically, each time the optical head accesses to a track of a different zone, the reference clock frequency is renewed. Then, data is stored in the track, and the data is reproduced from the track.

When an M-CAV formatted optical disk is installed in an optical disk apparatus, the apparatus needs to interrupt data-recording, data-reproducing or data-erasing operation for some time whenever any zone of an optical disk is switched to the adjacent zone of the optical disk in order to record data in, reproduce data from, or erase data from, a track of the adjacent track. While the disk is being rotated one turn after the data-processing operation has been interrupted, the frequency of the master clock signal used is altered and stabilized. Namely, the optical disk apparatus has a wait time approximately equal to the time the disk requires to rotate 360°. Within this wait time, the frequency of the master clock signal is stabilized, whereby data can thereafter be recorded in, reproduced from, or erased from, a data section of the newly selected zone. Due to the wait time, the conventional optical disk apparatus cannot record, reproduce or erase data continuously. Its operating speed is inevitably low.

SUMMARY OF THE INVENTION

An object of the present invention is to provide an optical disk apparatus which can continuously record in, reproduce form, and erase data from, an M-CAV formatted optical disk even when a zone of the optical disk is switched to another zone of the optical disk.

Another object of the invention is to provide an optical disk apparatus which can change the master clock frequency assigned to a zone to the master clock frequency assigned to another zone as soon as the zone is switched to the other zone, so that data can be recorded in, reproduced from, and erased from, the other zone, by using a master clock signal having the frequency assigned to the zone.

According to this invention, there is provided an optical disk apparatus for reproducing data from an optical disk having a plurality of substantially concentric tracks which are grouped into a plurality of zones arranged in a radial direction of the disk, each of which is divided into the same number of sector regions each used as a unit area and each of which has a different assigned frequency at which to read data from the sectors, the apparatus comprising:

data-generating means for generating data to be recorded;

beam-generating means for generating a light beam;

drive means for rotating an optical disk at a constant speed;

beam-focusing means for focusing the light beam onto a track of the optical disk, detecting the light beam reflected from the track, and reproducing signals from the light beam reflected from the track;

signal-detecting means for detecting data clock signal from the signals reproduced;

position-detecting means for detecting a start position of a sector region of the optical disk from the signals reproduced, generating a sector-start signal, and demodulating data obtained from the signals reproduced, in response to the sector-start signal by using the data clock signal;

zone-switching detecting means for detecting, from the data reproduced, that a zone of the optical disk has been switched to another zone thereof, generating a zone-switching signal, and generating a frequency-setting signal representing a frequency assigned to the other zone;

a reference clock source for providing a reference clock signal;

a phase-locked loop circuit for setting a frequency in accordance with the frequency-setting signal, generating a master clock signal having the frequency set, from the reference clock signal input, and switching a gain to acquire a new response characteristic;

gain-switching means for switching the gain of the phase-locked loop circuit in response to a zone-switching signal and the sector-start signal, thereby generating a master clock signal having the frequency set by the phase-locked loop circuit; and data-modulating means for modulating data into record signals by using the master clock signal generated by the phase-locked loop circuit, modulating the light beam generated by the beam-generating means by using the record signals, and applying the light beam onto the optical disk to write the data in the sector region of the optical disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a plan view illustrating the relationship between zones and sectors of an optical disk used for the optical disk apparatus shown in FIG. 1;

FIGS. 5A, 5B and 5C are, respectively, an example of a digitized signal to be recorded in the sector shown in FIG. 4, a pit mark to be recorded in the track in accordance with the digitized signal, and a signal waveform reproduced from the pit mark;

FIG. 6A and 6B shows waveforms of a digitized signal and a data clock for demodulating this signal, respectively;

FIG. 7A, 7B and 7C are, respectively, an example of a digitized signal to be recorded as a sector mark, an example of such a pit mark, and a signal waveform reproduced from the pit mark;

FIG. 9 is a block diagram schematically showing an example of the master clock PLL circuit illustrated in FIG. 8;

FIG. 10 is a diagram representing the gain-frequency relationship which the master clock PLL circuit has;

FIGS. 11A, 11B and 11C are a waveform diagram showing the relationship between a control signal and the output of the phase comparator used in the circuit of FIG. 9; and FIGS. 12A, 12B, 12C, 12D, 12E and 12F are a timing chart illustrating the outputs from the components of the master clock PLL circuit shown in FIG. 9.

DETAILED DESCRIPTION OF THE PREFERRED EMBODIMENT

An optical disk apparatus according to an embodiment of the present invention will now be described with reference to drawings.

Figure 1:
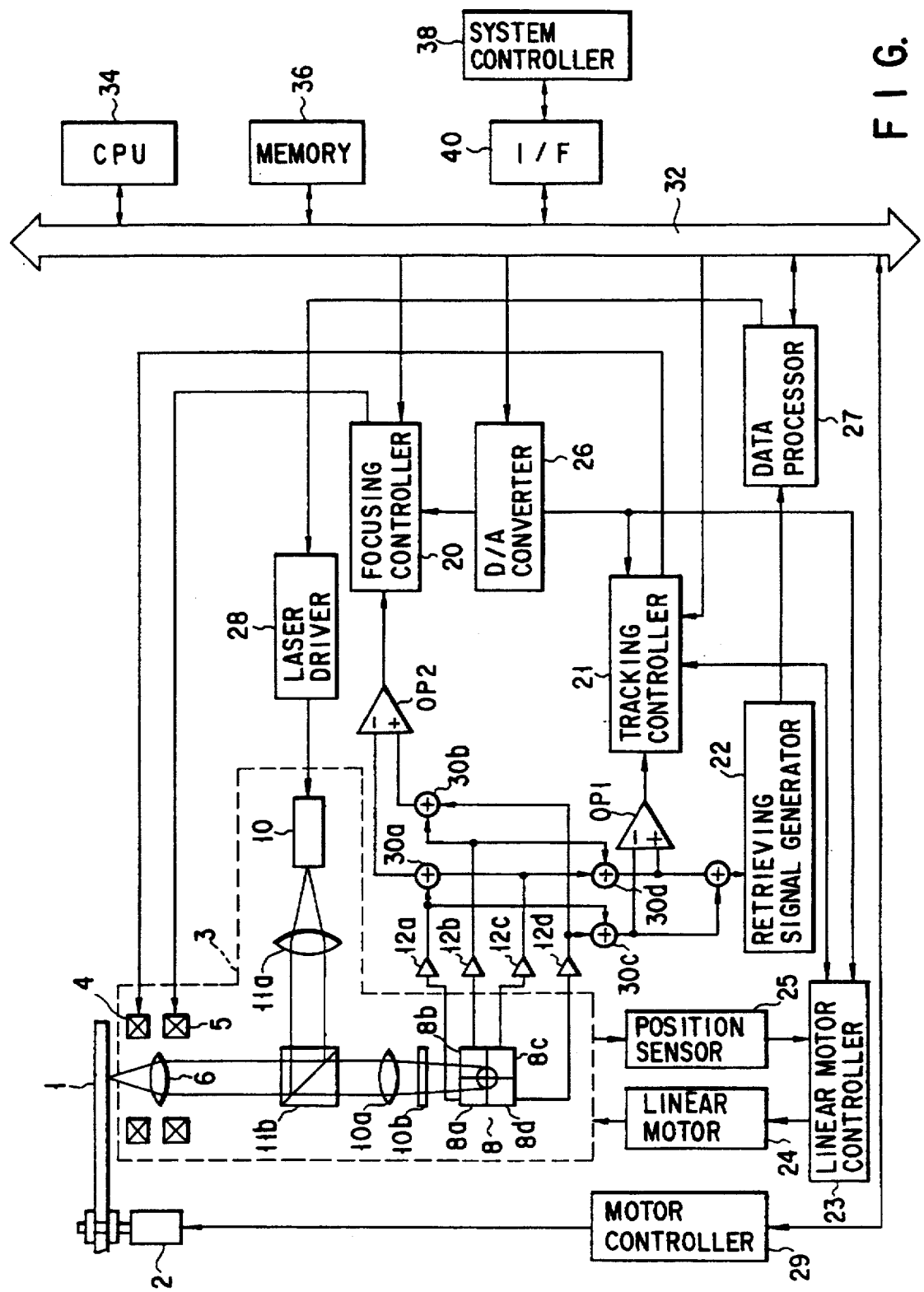
FIG. 1 is a schematic block diagram showing an optical disk apparatus according to an embodiment of the present invention.

FIG. 1 is a block diagram showing a brief structure of an optical disk apparatus of the present invention, for example, an image filing apparatus. In the disk apparatus shown in FIG. 1, an optical detector 8, a semiconductor laser 10 and an optical system are built in an optical head 3, which is mounted on a carriage (not shown), and the head is held movably in the radial direction of an optical disk 1 by a linear motor 24. In the optical head 3 having such a structure, an optical beam generated from the semiconductor laser 10 is collimated by a collimator lens 11a, and guided to an objective lens 6 via a half prism 11b. The laser beam is converged by the objective lens 6 onto the optical disk 1. The optical disk 1 is rotated at a constant rotation speed by the motor 2 controlled by a motor controller 29.

In the reproduction mode, a reproduction laser beam having a constant light intensity is generated from the semiconductor laser 10. In the recording mode, a recording laser beam whose light intensity has been modulated by a recording signal, to be larger than that of the reproduction beam, is generated from the semiconductor laser 10. In the erase mode, an erasing laser beam having a light intensity larger than that of the reproduction beam, is generated from the semiconductor laser 10.

The reflection light beam is directed from the optical disk 1 back to the objective lens 6, and the reflection light beam emerged from the objective lens 6 is allowed to pass through the half mirror 11b, then directed to an astigmatism detection optical system which consists of a focusing lens 10a and a cylindrical lens 10b. The light beam, as passing through the detection optical system, is concentrated and output onto an optical detector 8 including four optical detection cells 8a, 8b, 8c and 8d. Thus, an optical beam spot is formed on the detector 8. The shape of the beam spot formed on the detector 8 varies in accordance with the focusing state of the objective lens 6, and therefore the focusing state can be checked by detecting the variation of the beam shape by the optical detection cell 8a, 8b, 8c and 8d. Further, the tracking state of the objective lens 1, which indicates whether or not the light beam is accurately following a track on the optical disk 1, can be checked by detecting the beam spot by the optical detection cells 8a, 8b, 8c and 8d, since the image of the track is formed in the beam spot on the detector 8. In the reproduction mode, a reproduction light beam is modulated while it reflects on the optical disk, and the modulated optical beam is made incident on the optical detector 8. Therefore, a reproduction signal can be generated by adding the detection signals from the optical detector 8 together.

The optical detection cells 8a, 8b, 8c and 8d are connected respectively to amplifiers 12a, 12b, 12c and 12d. Detection signals from the amplifiers 12a and 12c are added up by an adder 30a, whereas detection signals from the amplifiers 12b and 12d are added up by an adder 30b. Addition signals from the adders 30a and 30b are applied to an operation amplifier OP2. Therefore, a difference signal which corresponds to the difference between the two addition signals, is generated from the operation amplifier OP2 as a focus signal, and the focus signal is applied to a focusing controller 20. On the other hand, detection signals from the amplifiers 12a and 12d are added up by an adder 30c, whereas detection signals from the amplifiers 12b and 12c are added up by an adder 30d. Addition signals from the adders 30c and 30d are applied to an operation amplifier OP1. Therefore, a difference signal which corresponds to the difference between the two addition signals, is generated from the operation amplifier OP1 as a tracking signal, and the tracking signal is applied to a tracking controller 21. Further, addition signals from the adders 30c and 30d are added up by an adder 30e, and supplied to a retrieving signal generator 22 as a retrieving signal.

A coil driving signal for driving a focusing driving coil 5 is generated from the focus controller 20 in response to a focus signal, and the objective lens 6 is driven in its optical axis direction by the focusing driving coil 5. Thus, the objective lens 6 is maintained in a focus state at all times, and an optical beam is focalized on the optical disk 1 by the objective lens 6. Further, a driving signal for driving the driving coil 4 for tracking is generated from the tracking controller 21 in response to a tracking signal, and the objective lens 6 is moved in the direction normally crossing its optical axis, and directed onto the track on the optical disk 1 at all times. Therefore, the objective lens 6 is maintained in the tracking state, and the light beam from the objective lens 6 is rendered to follow the target track.

In the case where a tracking error exceeding such a range that can be corrected by the driving coil 4 for tracking, a signal is applied to a linear motor controller 23, and a driving signal is applied from the linear motor controller 23 to a liner motor 24, thus driving the linear motor 24. Consequently, the carriage on which the optical head 3 is placed, is finely moved. Coupled with the fine movement of the carriage, the objective lens 6 is moved such that the light beam follows the target track by the driving coil 4 for tracking. The linear motor 24 is operated as described, so as to move the objective lens always to be located in the range in which a track error can be corrected.

The position of the carriage on which the optical head 3 is placed, is detected by a position detector 25. A position signal from the position detector 25 is transmitted to a CPU 34 via the linear motor controller 23, a D/A converter 26 and a bus 32. With this structure, the CPU 34 is able to monitor the position of the carriage at all times. When accessing a target track, the track number of the target track, which is input from outside, and the track number of the track currently searched are compared by the CPU 34, and the movement signal corresponding to the difference therebetween is applied from the CPU 34 to the linear motor controller 23 via the D/A converter 26, thus driving the linear motor 24. Therefore, when accessing, the carriage is quickly moved so as to search the target track. For the accessing, an access signal is applied from the CPU 34 to the focusing controller 20 and the tracking controller 21 via the D/A converter 26, and the objective lens 5 is moved to the home position with respect to the focusing and tracking operations.

In the reproduction mode, a reproduction driving signal having a constant level is applied from a laser driver 28 to the semiconductor laser 10, and a reproduction light beam is generated from the semiconductor laser 10. Further, a digitized reproduction signal is generated from the laser retrieving signal generator 22, and applied to a data processor 27, which will be explained later, where the signal is converted into reproduction data. The reproduction data is applied to the CPU 34 via the bus 32, and stored in a memory 36. In the recording mode, recording data is supplied from a system controller 38, which is outside the optical disk apparatus, to the bus 32 via an interface 40, and thus the recording data is supplied to the data processor 27 under the control of the CPU 36. The recording data is converted by the data processor 27 into a recording signal, which is supplied to the laser driver 28. The semiconductor laser 10 is driven by a driving signal which corresponds to the recording signal, and a laser beam whose intensity has been modulated in accordance with the recording signal is generated from the semiconductor laser 10.

Figures 3, 4:
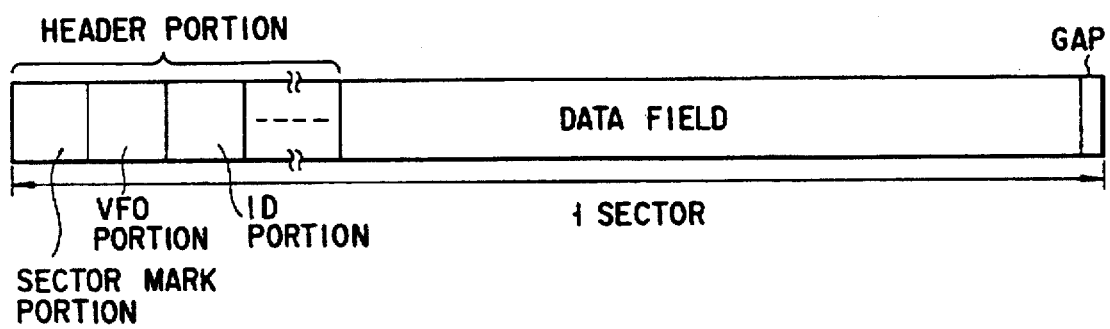
FIG. 3 is an explanatory diagram illustrating the number of sectors of one track in each zone shown in FIG. 2, and the frequency deviation of reproduction signals.
FIG. 4 is a diagram showing a header portion, which is pre-format data, and a data field, as of one unit sector of a track in a zone shown in FIG. 2.

As shown in FIG. 2, The optical disk 1 which has been formatted by the Z·CAV mode or the M·CAV mode has tracks arranged in substantially a coaxial manner, which are divided into a plurality of band regions defined in the radial direction, for examples, ten zones 1A to 1J, each having a plurality of tracks, and which are also divided into a plurality of sectors along the circumferential direction, each being a unit of recording data. The number of sectors is the same within one zone. Further, data clocks each having a particular frequency are assigned for the zones 1A to 1J for reproduction/recording of data from/on a track in a zone, and a data clock is prerecorded in the header portion Hs of the track. The frequency deviation of the data clocks between zones adjacent to each other, is defined to 6.7% to 4.3%, and the number of sectors within one track differs from one zone from another among 1A to 1J. FIG. 3 shows the relationship between the frequency deviation of the data clock assigned to each of the zones 1A to 1J, and the number of sectors in one track, and such relationships are stored in a table 24a of the memory shown in FIG. 1. In other words, the memory 24 has a zone management table, in which the number of sectors per track (one round) in each zone (area number), memory for each zone, and the frequency deviations of the data clocks, shown in FIG. 3, are stored.

Each of the zones 1A to 1J of the optical disk 1, as can be seen in FIG. 4, consists of a header portion, which is a pre-format area prerecorded as format data, and a data field which is a data area in which the user can store data afterwards. In the header portion, a sector mark portion SM for expressing the start of a sector, a VFO portion in which a synchronous code is recorded, and an ID portion ID in which ID data is recorded are arranged periodically in a plurality of times. At the ultimate end of the data field, a gap region in which no data is recorded, is provided in order to clarify the border between the data field and the next sector.

The VFO portion, the ID data portion and the data field store data which are (2–7)-modulated, i.e. modulated data in the mode in which 2 to 7 "0"'s are inserted between "1" and "1" as shown in FIG. 5A. Based on the modulated data, a pit mark shown in FIG. 5B is formed on the optical disk 1, and the pit mark is reproduced as a signal shown in FIG. 5C. In the ID portion, a track number, a sector number and a CRC code are recorded as ID data. In the VFO portion, a synchronous code in which "1" is read out at a constant period, such as "100100100 . . . " is recorded. The code is set in the manner that "1" shown in FIG. 6A is read out while 3 data clocks are generated as shown in FIG. 6B. In short, the data is synchronized with a data clock B in phase to read the data, the data clock B being supplied from a PLL circuit 45, which will be described later. In such a synchronous code, as long as an interval between a pulse and pulse is not detected to be 2 or 4 clocks, not 3 clocks, the erroneous reading does not occur.

In the sector mark portion, a mark ("0" or "1" is repeated in a plurality of times) is actually formed on the optical disk 1 as shown in FIGS. 7A to 7C. The sector mark pattern stored in the sector mark portion consists of long mark patterns, respectively, corresponding to 10 data clocks A within a block a, 6 data clocks A within a block b, 6 data clocks A within a block c, 14 data clocks A within a block d, 6 data clocks A within a block e to block h, and 10 data clocks A within a block i, as shown in FIGS. 9A and 9B, and a channel bit pattern "0000010010".

Figure 8:
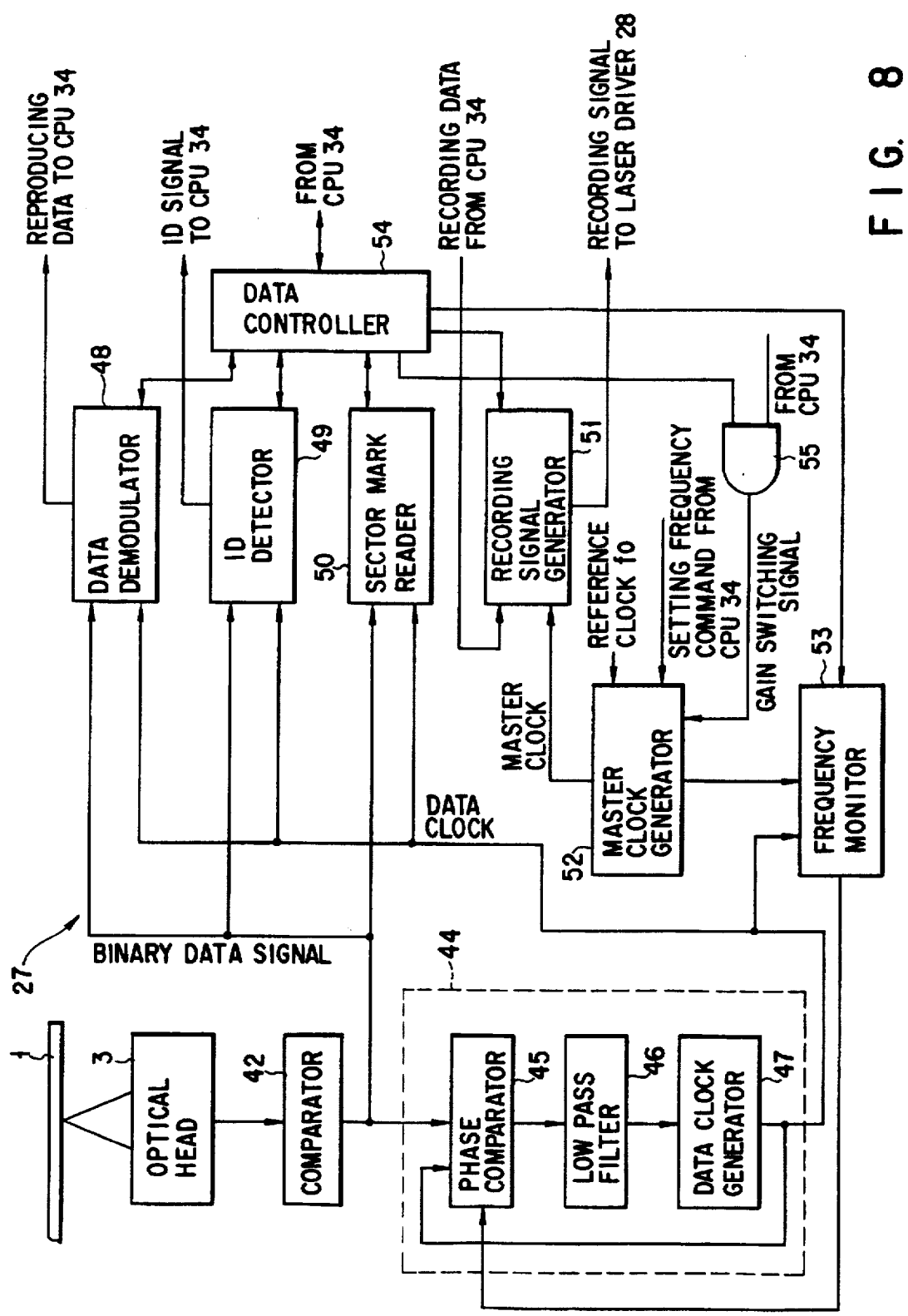
FIG. 8 is a block diagram showing a data processor shown in FIG. 1.

These signals are supplied as reproduction signals to the data processor 27 shown in FIG. 1, where the signals are converted into ID data as pre-format data, that is, address data (track number, sector number, etc.) and reproduction data. The data processor 27 consists of circuits such as shown in FIG. 8. With this structure, as shown in FIG. 8, an addition signal from the optical head 3 is digitized in the comparator 42 in the retrieving signal generator 22, and then supplied to the data processor 27 as a reproduction signal. The digitized reproduction signal from the comparator 42 is supplied to a data clock PLL 44 which generates a data clock, a data demodulator for demodulating reproduction data from the digitized reproduction signal, an ID detector 49 for detecting ID data from the digitized signal, and a sector mark reader 50 for detecting a sector mark from the digitized signal.

In the data clock PLL 44, a phase comparator 45 compares the data clock signal generated by a data clock generator 47 with the sync code (FIG. 5C) contained in the retrieving signal (FIG. 4) supplied from the VFO section. The output signal of the phase comparator 45 is supplied to a low-pass filter 46. The filter 46 removes the harmonic component of the signal, generating a voltage signal which represents the results of the comparison. The voltage signal is supplied to the data clock generator 47. The data clock generator 47 generates a data clock signal from the voltage signal. Namely, the data clock PLL 44 outputs a data clock signal which is synchronous with the sync code contained in the retrieving signal supplied from the VFO section.

The data clock signal is supplied to the data demodulator 48, the ID detector 49, the sector mark reader 50, and a frequency monitor 53. Using the data clock signal, the data demodulator 48 and the ID detector 49 demodulate the binary data signal to obtain reproduced data and ID data, respectively. In response to the data clock signal, the sector mark reader 50 reads a sector mark. The frequency monitor 53 monitors the data clock signal and, also, a master clock signal.

The data processor 27 shown in FIG. 8 has a master clock generator 52. To reproduce data from a track of a particular zone, the CPU 34 selects the frequency assigned to the zone, from the table of the memory 24, and then supplies a frequency-setting command to the master clock generator 52. The frequency-setting command designates the frequency selected. Upon receipt of this command, the master clock generator 52 generates, from a reference frequency $f_0$, a master clock signal of the frequency designated by the frequency-setting command. The master clock signal is supplied to a recording signal generator 51 and the frequency monitor 53.

The master clock signal is synchronous with the data clock signal reproduced by the VFO section, while the track of the zone designated by the CPU 34 is being scanned with the light beam. In this case, the sector mark reader 50 detects the sector mark (FIG. 7A), by using the data clock signal. The sector mark is detected in the form of a sector mark signal of the type illustrated in FIGS. 7C. The sector mark signal is supplied to a data controller 54. The data controller 54 determines, from the sector mark signal, that the retrieval of the sector including the designated zone has been initiated. The data controller 54 instructs the ID detector 49 to demodulate the binary data signal to obtain ID data, and also instructs the data demodulator 48 to demodulate the binary data signal to reproduce data. The ID detector 49 detects ID data from the binary data signal. The ID data includes a track number, a sector number and a CRC code ID. The ID data is supplied to the CPU 34 under the control of the data controller 54. The CPU 34 stores the ID data into the memory 24. Then, using the data clock signal, the data modulator 48 modulates the reproduced signals retrieved from the data field, thereby reproducing data. In other words, the data modulator 48 demodulates the binary data signal which is modulated by a 2–7 code. The data contained in the reproduced signal is thereby reproduced. The data, thus reproduced, is supplied to the CPU 34 under the control of the data controller 54. The CPU 34 stores this data into the memory 24.

If the master clock signal is not synchronous with the data clock signal reproduced by the VFO section, this is detected by the frequency monitor 53. The frequency monitor 53 compares the data clock signal with the master clock signal in terms of frequency. If the monitor 53 finds that the frequency of the data clock signal is higher than that of the master clock signal, it outputs a frequency-decreasing signal to the phase comparator 45. If it detects that the frequency of the data clock signal is lower than that of the master clock signal, the monitor 53 outputs a frequency-increasing signal to the phase comparator 45. If it detects that the frequency of the data clock signal is equal to that of the master clock signal, the monitor 53 locks the data clock signal at the frequency of the master clock signal.

In the recording mode, the data in the header section is read into the memory 36 and is subsequently supplied from the memory 36 to the recording signal generator 51 via the CPU 34, by means of the data controller 54. The data to recorded is modulated into a 2–7 code, by the use of the master clock signal generated by the master clock generator 52. This data is supplied to the laser driver 28 under the control of the data controller 54 at the start of the retrieval of the data field. The data is thereby recorded in the data field of one sector of the optical disk 1.

The frequency of the master clock signal is changed to switch one zone to another in the recording mode. More specifically, the CPU 34 reads the sector address from the header section of a zone being retrieved, thereby determining in which sector of that zone data is recorded. When the data retrieval proceeds to the last sector of the zone, the CPU 34 generates a zone-switching signal and supplies the signal to an AND circuit 55. In the meantime, the data controller 54 generates a header-detecting signal every time the sector mark reader 50 detects a sector mark, and supplies the header-detecting signal to the AND circuit 55. Upon receipt of the zone-switching signal and the header-detecting signal, the AND circuit 55 outputs a gain-switching signal, which is supplied to the master clock generator 52. Thus, the master clock signal generated from the master clock signal generator 52 is abruptly changed in frequency.

The master clock generator 52 comprises a PLL circuit and has a circuit arrangement shown in FIG. 9. As shown in FIG. 9, the generator 52 comprises a phase comparator 60, a filter amplifier 61, a voltage-controlled oscillator 62, and a frequency divider 63. The phase comparator 60 has two inputs. It receives, at one input, a reference clock signal output from a quartz oscillator and having a frequency $f_0$, scarcely affected by changes with temperature, humidity or time. The voltage-controlled oscillator 62 generates a master clock signal and supplies this signal to the frequency divider 63. The frequency divider 63 divides the frequency of the master clock signal by N which is an integer. The master clock signal, thus frequency-divided, is supplied to the other input of the phase comparator 60. The phase comparator 60 compares the master clock signal with the reference clock signal in terms of frequency. It generates a voltage signal which represents the frequency difference between the two input signals. The voltage signal is supplied to the filter amplifier 61 which includes an amplifier 64 and a gain-switching circuit 65. The filter amplifier 61 amplifies and smoothens the voltage signal and supplies the signal to the voltage-controlled oscillator 62. The oscillator 62 generates a master clock signal from the voltage signal input to it.

The integer N set in the frequency divider 63 is one of those assigned to the zones of an optical disk having M-CAV format. Every time one zone is switched to another, the CUP 23 generates a frequency-setting signal, whereby the integer N assigned to the new zone is set in the frequency divider 63. The reference clock signal and the master clock signal has the relationship of: $f_0 \times N = f_M$, where $f_0$ is the frequency of the reference clock signal and $f_M$ is that of the master clock signal. The frequency $f_M$ divided by the integer N, i.e., $f_M/N$, is equal to the frequency $f_0$. Therefore, the frequency $f_0$ multiplied by the integer N is equal to the frequency $f_M$—that is, $f_M = f_0 \times N$.

The gain-switching circuit 65 incorporated in the master clock PLL circuit shown in FIG. 9 switches the gain of the filter amplifier 61. In other words, the amplification factor of the filter amplifier 61 is changed by operating the gain-switching circuit 65. Generally, the loop gain of a PLL circuit of the type shown in FIG. 8, which determine the response of the PLL circuit, is given as: Kp Kf Kv/N, where Kp and Kf are transfer functions. The response of the PLL circuit is therefore switched when the amplification factor Kf of the filter amplifier circuit 61 used in the master clock PLL circuit of FIG. 9 is changed. Namely, the greater the loop gain of the PLL circuit, the higher the cutoff frequency of the PLL circuit (changing from $f_1$ to $f_2$). As a result, the PLL circuit will respond faster.

FIGS. 11A, 11B and 11C are a waveform diagram explaining the output of the phase comparator 60 used in the master clock PLL circuit of FIG. 9. As can be understood from FIG. 11A, the output of the phase comparator 60 has a charge width $T_0$ and a discharge width $T_1$. The charge width $T_0$ represents the phase difference between the reference clock signal having the frequency $f_0$ and the frequency-divided clock signal having the frequency $f_M/N$. The discharge width $T_1$ has a fixed value. When there is no difference between the widths $T_0$ and $T_1$, the phase comparator 60 operates in normal state. When the gain of the PLL circuit is large as in the case where the gain Kf of the filter amplifier 61 (FIG. 9) is switched, the output of the phase comparator 60 cannot be smoothened completely. In this case, the frequency of the master clock signal output by the voltage-controlled oscillator 62 will vary during the period between the present phase comparison and the next phase comparison. Hence, it is desirable that the Kf of the filter amplifier 61 be as small as possible if the master clock signal ($f_M$) is used as a signal having a little frequency fluctuation. When the gain of the PLL circuit is large, the PLL circuit fast responds to the switching of frequency and also to external disturbance, but the jitter is prominent while the PLL circuit is operating in normal state. On the other hand, when the gain of the PLL circuit is small the jitter is small while the PLL circuit is operating in normal state, but the the PLL circuit responds slowly.

The operation of the maser clock PLL circuit (FIG. 9) will now be explained, with reference to the timing chart of FIGS. 12A to 12F.

Assume that each of the sectors formed on the optical disk 1 has the format shown in FIG. 12A. As described above, every time a header section of the sector is retrieved, the data controller 54 generates a header area signal as shown in FIG. 12B. The CPU 34 determines, from the sector address of the header section, that a zone $Z_n$ will be switched to the next zone $z_{n+1}$, and generates a zone-switching signal as shown in FIG. 12C. The zone-switching signal is supplied to the AND circuit 55. When the zone Zn is switched to the zone $Z_{n+1}$, the CPU 23 changes the parameter for setting the frequency $f_M$ of the master clock signal, from a parameter N to a parameter N+1, as illustrated in FIG. 12E, and supplies the parameter N+1 to the frequency divider 63. Since the parameter for setting the frequency $f_M$ has been so changed, the frequency $f_M$ starts changing from $f_0$ N to $f_0$ (N+1). The speed at which the frequency $f_M$ so changes is determined by the gain of the master clock PLL circuit (i.e., the master clock generator 52).

When the header section in the first sector of the zone $Z_{n+1}$ is detected as illustrated in FIG. 12B, the data controller 54 generates a header-detection signal, which is supplied to the AND circuit 55. Hence, as long as the AND circuit 55 keeps generating the gain-switching signal as shown in FIG. 12D, the gain of the master clock PLL circuit remains large. As a result, the control voltage applied from the filter amplifier 61 increases, and the frequency $f_M$ of the master clock signal rises to $f_0$ (N+1). Since the control signal supplied from the voltage-controlled oscillator 62 is not smoothened thoroughly as explained above, the output frequency of the master clock PLL circuit fluctuates somewhat greatly as shown in FIG. 12F. Nonetheless, this frequency fluctuation imposes but a little influence because the master clock signal output by the PLL circuit does not play an important role. The spot formed by the light beam emitted from the optical head 3 moves from the header area to the data area to record data in, or erase data from, the data area. At this time, the master clock signal has its frequency already changed to $f_0$ (N+1), and the gain of the master clock PLL circuit has its gain already decreased by the gain-switching signal. In addition, the control signal output from the oscillator 62 has been smoothened almost completely as illustrated in FIG. 12F and contains little jitter. The master clock signal, now having the frequency $f_0$ (N+1), serves to record data in the disk 1 and reproduce data therefrom, with high precision.

In the erasing mode, the CPU 34 supplies to the data processor 27 (FIG. 8) an erasing signal or erasing data, instead of a recording signal which it supplies to the processor 27 in the recording mode. In response to the erasing signal, the data processor 27 erases the data recorded in the data field section of the sector. The processor 27 operates to erase the almost the same way as it does to record data. Therefore, how it erase the data is not described here. In the erasing mode, as well, the gain of the filter amplifier 61 is increased, whereby the frequency of the master clock signal is fast switched.

As has been described above, every time a zone is switched to newly selected one, the gain of the master clock PLL circuit is increased for the header area. The time required to change the frequency of the master clock signal to the frequency assigned to the newly selected zone is thereby shortened. The optical disk apparatus of this invention can therefore record and erase data without break.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical disk apparatus for recording data on a recording medium which is partitioned into a plurality of zones, data being recorded on the zones by utilizing different frequencies and the frequencies being particular to the respective zones, comprising:

first generating means for generating a reference clock signal;

second generating means for generating a recording clock signal having one of the frequencies which is set with reference to the reference clock signal from said first generating means and a dividing ratio which is determined in accordance with a first of the zones and is stabilized in accordance with one of first and second response rates, the second response rate being greater than the first response rate;

means for changing the dividing ratio in accordance with a second of the zones and setting the changed dividing ratio, when the data recording is switched from the first of the zones to the second of the zones; and means for temporarily switching the second response rate from the first response rate, when the data is switched from the first of the zones to the second of the zones.

2. An optical disk according to claim 1, further comprising:

means for detecting a boundary between the first of the zones and the second of the zones to energize said switching means.

3. An optical disk according to claim 1, further comprising:

means for generating a response rate switching signal when the data is switched from the first of the zones to the second of the zones, wherein said switching means is energized in accordance with the zone switching signal.

4. An optical disk according to claim 2, wherein said second generating means includes means for causing said switching means to set the second response rate in a predetermined time period.

5. An optical disk apparatus for retrieving data on a recording medium which is partitioned into a plurality of zones, data being recorded on the zones by utilizing different frequencies and the frequencies being particular to the respective zones, comprising:

first generating means for generating a reference clock signal;

second generating means for generating a clock signal having one of the frequencies which is set with reference to the reference clock signal from said first generating means and a dividing ratio which is determined in accordance with a first of the zones and is stabilized in accordance with one of first and second response rates, the second response rate being greater than the first response rate;

means for changing the dividing ratio in accordance with a second of the zones and setting the changed dividing ratio, when the data recording is switched from the first of zones to the second of the zones; and means for temporarily switching the second response rate from the first response rate, when the data is switched from the first of the zones to the second of the zones.

6. An optical disk according to claim 5, further comprising:

means for detecting a boundary between the first of the zones and the second of the zones to energize said switching means.

7. An optical disk according to claim 5, further comprising:

means for generating a response rate switching signal when the data is switched from the first of the zones to the second of the zones, wherein said switching means is energized in accordance with the zone switching signal.

8. An optical disk according to claim 7, wherein said second generating means includes means for causing said switching means to set the second response rate in a predetermined time period.

* * * * *